UNITED STATES PATENT OFFICE.

VICTOR DE KARAVODINE, OF PARIS, FRANCE, ASSIGNOR TO BERNARD ROUX, OF PARIS, FRANCE.

TREATMENT AND UTILIZATION OF WASTE VULCANIZED RUBBER AND EBONITE.

No. 838,419. Specification of Letters Patent. Patented Dec. 11, 1906.

Application filed March 22, 1904. Serial No. 199,485.

*To all whom it may concern:*

Be it known that I, VICTOR DE KARAVODINE, a subject of the Emperor of Russia, and a resident of Paris, France, have invented a new and useful Improved Treatment and Utilization of Waste Vulcanized Rubber and Ebonite, which is fully set forth in the following specification.

This invention relates to the treatment of waste vulcanized rubber, ebonite, or mixture of vulcanized rubber and ebonite, whereby the original character thereof may be restored.

The process for attaining the result in question is as follows: The material is granulated, or, still better, pulverized to produce a homogeneous mass and is then mixed with pulverized sulfur in the proportions of from one to ten per cent. The quantity of sulfur is not of much importance, and it may be increased without unfavorably affecting the quality of the product, more particularly if the material used does not already contain an excessive quantity of sulfur. The mixture of the material to be treated and the sulfur is then placed in a metal mold, preferably heated to a temperature of 150° to 200° centigrade, and compressed by means of a press under a very high pressure—say about five hundred atmospheres. The greater the pressure the better will be the result obtained; but certain kinds of ebonite give excellent results even at a pressure of one hundred atmospheres or even less. The pressure is maintained for a minute or two, but may be kept up for a longer period without any inconvenience, and by maintaining the temperature during the pressing at between 150° and 200° by suitable means, the strength of the product is increased.

The temperature, pressure, and duration of the operation can be modified as desired to suit the character of the material under treatment and the quality of the product required.

During the operation the sulfur softens the surfaces of the particles of the material to such an extent that when subjected to great pressure they are thoroughly welded together, after which the mold may be cooled down and the pressure relieved, the material being then taken out from the mold in the form of a perfectly homogeneous and solid block. In order to produce an article of any kind from the material so prepared, the block is placed in a mold having the shape of the article to be produced and subjected to the action of a temperature of between 150° and 200° centigrade at a sufficient pressure to cause it to assume the desired shape. When the molding is completed, the mold is cooled down and the article taken out, when it will be found to have the desired shape and present all the qualities of the ordinary material or materials used with possibly even greater homogeneity than that prepared in the usual manner.

If desired, the powdered material might be given the desired final shape at the first pressing; but a better result is obtained by proceeding in the manner described.

The addition of sulfur to the material when reduced to powder is not absolutely necessary; but if it is omitted the ultimate product will not be so strong.

To the above-mentioned mixture of powdered material and sulfur mica in small particles or asbestos in fibers could be added and an exceedingly strong article so obtained.

In order to better weld asbestos fibers or particles of mica with the mass of material, and in order to protect them against the action of acids, it is preferable before mixing them with the vulcanized rubber, ebonite, or the mixture of vulcanized rubber and ebonite to impregnate them with molten resin or coal-tar or vegetable tar or siccative oil. In the latter case the oil must be allowed to dry before adding the asbestos or the mica to the material. Other suitable binding agents might be employed. The mica or asbestos could also be kneaded or mixed with a solution of non-vulcanized rubber, adding to it the quantity of sulfur powder required for complete vulcanization of the rubber employed. This preparation of fibers of mica or asbestos is then added to any desired quantity of powdered vulcanized rubber, ebonite, or the mixture of vulcanized rubber and ebonite, to which preferably has been added from one to ten per cent. of sulfur and the whole then mixed in a suitable apparatus. The mixture is heated in order to distil the solvent used for the rubber and compressed in a hot mold, as already described with reference to the previously-described ebonite. To produce the desired result, the material must be maintained at a temperature of about 180° centigrade during the time required in order to give the rubber with which the asbestos has been impregnated sufficient time to become completely vulcanized. The material could also be compressed, when hot, for a few minutes and then the block obtained placed into a vulcanizing-oven. In this way the mixture of asbestos or mica and rubber can be vulcanized and the product obtained could be subsequently granulated or pulverized and added to the powdered material, to which latter one to ten per cent. of sulfur has been added, and the whole treated as already stated with reference to ebonite. The material to be treated thus mixed with asbestos or mica fibers is quite easily molded when hot into articles of any shape in the manner above described.

In the case of vulcanized rubber it is necessary to prevent the rubber from escaping during the compression past the compressing-piston by covering the same at the top with a layer of about two centimeters thick of powdered coal or carbon. The pressure and the temperature are maintained for about two to twenty minutes or more, according to the quality of the rubber used and that of the article or material to be obtained, and the block so produced may subsequently be given any desired shape in the manner above described with reference to ebonite.

It will be readily understood that this process can be utilized for coating wires with a layer of vulcanized rubber by using apparatus similar to those used for the manufacture of cables covered with gutta-percha and by compressing vulcanized rubber round the wires; but in such cases the temperature and the pressure must be much greater than in the case of gutta-percha and must approximate those above mentioned.

All mixtures of granulated rubber or powdered ebonite and granulated rubber and powdered ebonite with the materials above mentioned can, if desired, be impregnated with a solution of non-vulcanized rubber, together with a sufficiency of sulfur for the vulcanization of the latter, and the mixture afterward dried. In this way a thin layer of non-vulcanized rubber and sulfur is obtained on the surface of each particle of vulcanized rubber or ebonite, and as a consequence the particles will be caused to adhere to each other more firmly under the application of heat and pressure applied as hereinbefore described. In such case it is useful to expose the material to a temperature of 180° centigrade and to a suitable pressure for a fairly long time, so as to effect complete vulcanization of the rubber solution. In this way after a short compression with application of heat the block or the object can be withdrawn from the mold and the vulcanization completed in a vulcanizing-oven; but it is preferable to operate under pressure.

I claim—

1. The process of treating and utilizing waste vulcanized rubber, ebonite, &c., which consists in granulating or pulverizing the waste material, and then subjecting the same to a temperature of from 150° to 200° centigrade and to a mechanical pressure of from one hundred to five hundred atmospheres.

2. The herein-described process of treating and utilizing waste vulcanized rubber, ebonite, &c., which consists in granulating or pulverizing the material to be treated, then adding a stiffening material such as particles of mica or asbestos fibers, which have previously been treated with a binding medium, and finally subjecting the mass to a high pressure at a high temperature.

In testimony whereof I have signed this specification in the presence of two subscribing witnesses.

VICTOR DE KARAVODINE.

Witnesses:
 E. LEDRET,
 HANSON C. COXE,
 EMILE LEDRET.